July 28, 1964 P. P. POLKO ETAL 3,142,193
BELT TENSIONING DEVICE
Filed Nov. 20, 1961
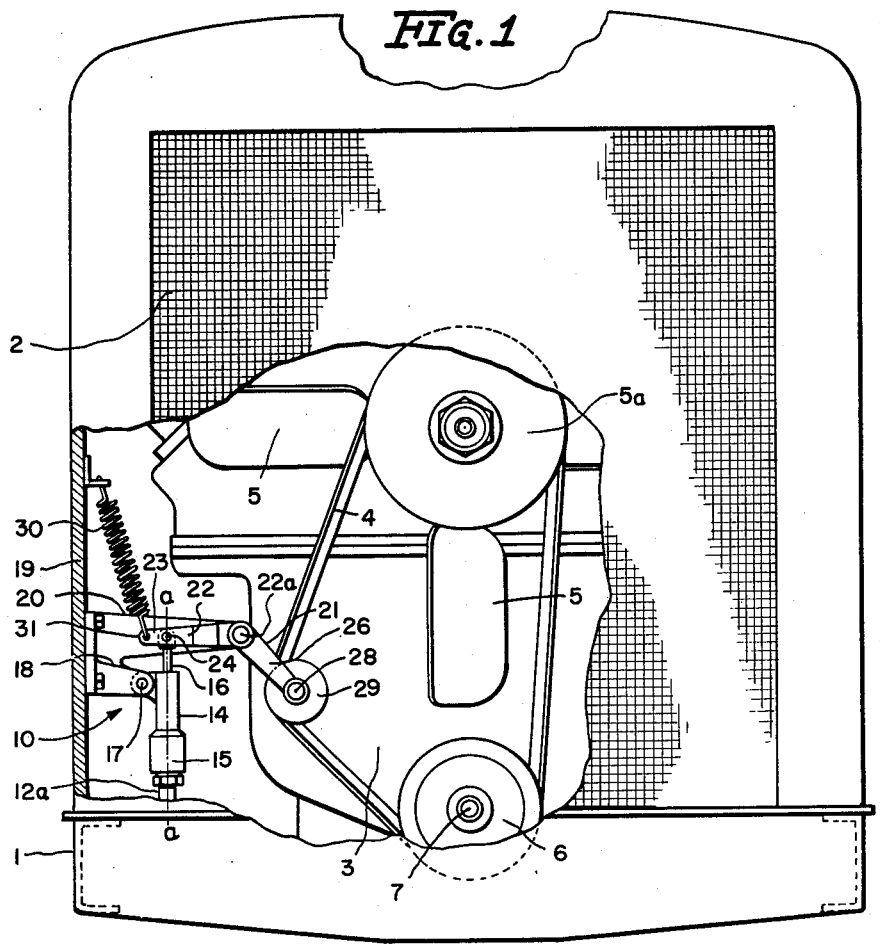
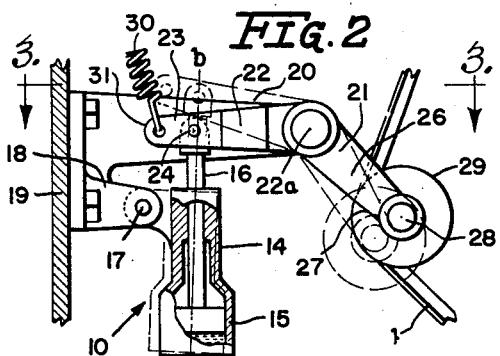
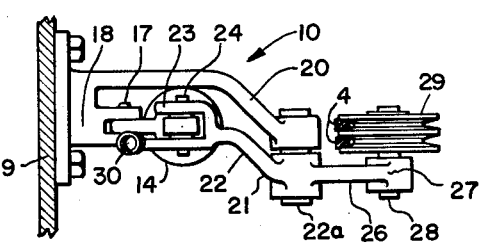
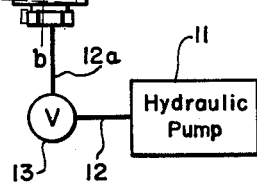
INVENTORS
Peter P. Polko
Lauri J. Kivisto

3,142,193
BELT TENSIONING DEVICE
Peter P. Polko, Lyons, and Lauri J. Kivisto, Wheaton, Ill., assignors to International Harvester Company, Chicago, Ill., a corporation of New Jersey
Filed Nov. 20, 1961, Ser. No. 153,360
3 Claims. (Cl. 74—242.11)

This invention relates to belt tensioning devices and in particular relates to belt tensioning devices of the hydraulic operated type effecting constant tension load on the belt.

Under presently constructed belt tensioning devices, it is a problem to maintain a drive belt sufficiently taut so that it may transmit a steady and smooth drive to a driven part. Under the arrangement of this invention, a constant load is maintained on the belt when it is in driving operation by the utilization of a hydraulic pump driven by an engine and the geometric construction of the tensioning device.

It is therefore an object of this invention to provide a constant load belt tensioning device. More particularly, this invention provides a dual force belt tensioning device for a belt entrained about driving and driven parts, comprising a hydraulic unit for applying a constant hydraulic operating force in the plane of the unit and secured at a point to supporting means for the unit; a projecting fixed arm passing adjacent the operating end of the hydraulic unit; a hydraulically operated bellcrank pivoted to the projecting end of the fixed arm and presenting first and second bellcrank arms; spring means substantially in the plane of the hydraulic unit and connected to bias the bellcrank in a force assisting relation to the force of the hydraulic unit; and a belt tensioning pulley connected to the second bellcrank arm in a position for effecting contact of running engagement with the belt; the hydraulic unit having a point of connection to the first bellcrank arm; the pulley being laterally offset from the bellcrank, there being a diagonal offset in said fixed arm, and a diagonal offset in the first bellcrank arm, all offsets being in the direction of the plane of the unit whereby the contact of running engagement between the belt and pulley, the projecting end of the fixed arm to which the bellcrank is pivoted, and the point of connection to the first bellcrank arm are substantially in the plane of the unit.

Another object of this invention is to provide a hydraulically operated constant load belt tensioning device operative only when the engine is in operation and to maintain only a slight load on the belt when the engine is not operating.

Another object of this invention is to provide a constant load hydraulically operated belt tensioning device for use on fan belts driven by an internal combustion engine and employs a novel geometrically arranged lever system that provides a decreasing lever arm for maintaining the constant load on a belt to take up its slack due to belt usage.

It is still another object of this invention to provide a hydraulically actuated constant load belt tensioning device which employs a bellcrank lever arrangement pivotally connected to a source of hydraulic pressure and having a tension pulley geometrically arranged to swing toward the hydraulic unit for providing a compact tensioning device regardless of the slack developed in the fan belt.

A still further object of this invention is to provide a constant load hydraulically operated tensioning device operated by the engine, and when the engine is not operating the constant load device is removed and only slight load is placed on the belt to keep it taut. This type of device improves and expands the life of the belt and has itself a longer life.

These and other objects will become apparent from reference to the following description and attached drawings. It is, however, to be understood that the disclosure presented by the description and drawings is not to be construed as a limitation on the scope and breadth of the claims appended hereto, wherein:

FIGURE 1 is a front elevational view of a vehicle partly in section and illustrating the novel belt tensioning device;

FIGURE 2 is an enlarged view partly in section illustrating the novel belt tensioning device of FIGURE 1; and FIGURE 3 is a sectional view taken along line 3—3 of FIGURE 1.

With reference now to the figures, there is shown a vehicle 1 having a radiator 2 in front of an engine 3. A fan belt 4 drives a fan 5 in front of the radiator 2 through a fan pulley 5a and is driven by a pulley 6 which in turn is driven by a forward output shaft 7 driven by the engine 3. This type of fan and radiator arrangement for cooling an internal combustion engine is of the conventional design.

The fan belt 4 through usage and general wear or for other reasons may become slack, and therefore there is provided a hydraulically actuated constant load tensioning device 10 for maintaining the belt 4 taut for smooth, even transmission of engine power to the fan pulley and fan. The belt tensioning device 10 consists of a hydraulic pump 11 which may be used for operating other hydraulic equipment on the vehicle 1 and having a line 12 having a pressure regulator 13 for maintaining a constant pressure in the line 12a which leads to a hydraulic unit 14 having a cylinder 15 and a hydraulic ram or piston 16 subject to the constant hydraulic pressure in line 12, the cylinder 15 having a grounded pivot point or pin 17 mounting the unit 14 to bracket 18 on the engine housing or hood assembly 19, the cylinder 15 of the hydraulic unit 14 being freely swingable about the pivot 17. A further bracket unit 20 adjacent the bracket 18 and also mounted to the engine housing 19 has a fixed arm which projects inwardly and diagonally forwardly from the engine housing 19 and carries at the projecting offset end of the fixed arm a bellcrank lever 21 by a grounded pivot or pin 22a mounted on the end of the bracket 20 and pivotally carrying the bellcrank 21 at its middle portion. The bellcrank 21 has an extension 22 projecting diagonally alongside of the bracket 20 and a bifurcated end portion 23 providing a pivotal connection or pin 24 connecting the outer or free end of the ram piston 16 thereto. The pivot 24 moves in an upward and downward arcuate path to the right of grounded pivot 17 as viewed in FIGURE 1, the grounded pivot 22a being generally horizontally removed diagonally forwardly and to the right of pivot 24. The arm 22 of the bellcrank lever 21 presents a lever between pivot 24 and pivot 22a and a further bellcrank arm 26 extends from the median portion of the bellcrank 21 to the right and diagonally downward to the right of pivot 22a and has a free end 27 carrying a pivot or pin 28 which carries a tensioning pulley 29 engaging the fan belt 4 and urging the fan belt at its point of engagement outwardly to the left as viewed in FIGURE 1.

As can be seen in FIGURE 1, the hydraulic force exerted on the piston 16 is generally vertical upwardly in a plane indicated as AA of the piston 16 of the unit 14 passing through the pivotal connection 24 of the piston 16 with the bellcrank arm 22 and this maintains the belt taut due to the constant load delivered by the hydraulic pump 11 and is the standard position taken by the belt 4 when it is new and permits a desirable positive drive from the engine to the fan 4. When the engine is not running the hydraulic pump 11 stops, and the hydraulic tensioning device 10 ceases to apply pressure to remove slack in the belt. However, a tension spring 30 connected to the engine housing 19 above the bracket 20 extends diagonally downwardly to the right and is connected to the tip 31 of the same end portion 23 of the bellcrank arm as the ram piston 16, to maintain pretension on the belt 4 so that it will not be loose and have an undue amount of slack.

As the belt 4 is used over a period of time it loses its strength or tautness, and, in order to ensure the positive drive, the constant load hydraulic tensioning device 10 maintains a constant outward pulling load on the fan belt urging the fan belt to the left through the bellcrank lever 21 as seen in dotted lines in FIGURE 2. As the belt 4 is pulled to a new position to maintain the same tautness or constant load for the same positive drive to the fan, the hydraulic unit with its piston member 16 is swung clockwise about the pivot 17 and the piston rod 16a is extended. Thus the free pivot 24 is moved to a new position to the right of its former position in order to bring the tension pulley 29 to the left. This is accomplished by shortening the lever arm 22 since now the hydraulic force passes through a plane indicated as dotted line BB and is a shorter perpendicular distance away from the bellcrank pivot 22a. It can thus be seen that in order to take up increasing belt slack, the lever arm must be reduced, and this contracts the belt tensioning device to maintain a constant load on the belt 4 and yet to keep the belt tensioning device within a small or compact area at the forward right end of the engine compartment 19.

Under this construction, it will be appreciated that constant hydraulic loads are maintained on the belt tensioning device for even and constant positive drive to the fan belt during the operation of the engine and that slight loads are maintained on the pulley sufficient to keep it taut when the engine is not operating by the application of a bellcrank lever operated through a hydraulic unit. By this arrangement, a belt is able to have a long service life, and yet the belt tensioning device unit occupies a small portion of the vehicle engine compartment.

What is claimed is:

1. A dual force belt tensioning device for a belt entrained about driving and driven parts, and including: a hydraulic unit for applying constant hydraulic operating force in the plane of the unit and secured at a point to supporting means for the unit; a bracket having a projecting fixed arm passing adjacent the operating end of the hydraulic unit; a hydraulically operated bellcrank pivoted to the projecting end of the fixed arm and presenting first and second bellcrank arms; spring means substantially in the plane of the hydraulic unit and connected to bias the bellcrank in a force assisting relation to the force of the hydraulic unit; and a belt tensioning pulley connected to the second bellcrank arm in a position for effecting contact of running engagement with the belt; the hydraulic unit having a point of connection to the first bellcrank arm; said pulley being laterally offset from the bellcrank, there being a diagonal offset in said fixed arm, and a diagonal offset in the first bellcrank arm, all offsets being in the direction of the plane of the unit whereby the contact of running engagement between the belt and pulley, the projecting end of the fixed arm to which the bellcrank is pivoted, and the point of connection to the first bellcrank arm are substantially in the plane of the hydraulic unit.

2. The invention of claim 1, wherein said point of securement of the hydraulic unit to the supporting means is intermediate the ends of the unit and disposed in the plane of the unit.

3. The invention of claim 2 wherein said spring means is anchored at one end, said first bellcrank arm having a common portion to which the spring means and the hydraulic unit are connected.

References Cited in the file of this patent

UNITED STATES PATENTS

| 2,051,488 | Kottlowski et al. | Aug. 18, 1936 |
| 2,521,413 | Scheuermann et al. | Sept. 5, 1950 |
| 2,795,135 | Kremser | June 11, 1957 |
| 2,877,005 | Silks | Mar. 10, 1959 |

FOREIGN PATENTS

| 849,938 | Germany | Sept. 18, 1952 |
| 856,089 | Germany | Nov. 20, 1952 |